US008034871B2

(12) United States Patent
Bochnik et al.

(10) Patent No.: US 8,034,871 B2
(45) Date of Patent: Oct. 11, 2011

(54) LATEX BASED OPEN-TIME EXTENDERS FOR LOW VOC PAINTS

(75) Inventors: Michael Bochnik, Yonkers, NY (US); Yakov Freidzon, Bridgewater, NJ (US); Robert Sheerin, North Caldwell, NJ (US); Ning Wu, Edison, NJ (US)

(73) Assignee: Columbia Insurance Company, Omaha, NE (US)

( * ) Notice: Subject to any disclaimer, the term of this patent is extended or adjusted under 35 U.S.C. 154(b) by 712 days.

(21) Appl. No.: 12/042,841

(22) Filed: Mar. 5, 2008

(65) Prior Publication Data

US 2009/0227705 A1 Sep. 10, 2009

(51) Int. Cl.

| | |
|---|---|
| ***C08L 31/00*** | (2006.01) |
| ***C08L 25/10*** | (2006.01) |
| ***C09D 5/16*** | (2006.01) |

(52) U.S. Cl. ......... 524/556; 524/577; 524/547; 523/122

(58) Field of Classification Search .................. 524/556, 524/577, 547; 523/122

See application file for complete search history.

(56) References Cited

U.S. PATENT DOCUMENTS

| | | | | |
|---|---|---|---|---|
| 5,270,380 | A | 12/1993 | Adamson et al. | |
| 6,303,189 | B1 * | 10/2001 | Gray et al. | 427/385.5 |
| 6,610,776 | B2 | 8/2003 | Laubender et al. | |
| 6,939,922 | B2 | 9/2005 | Beckley et al. | |
| 6,972,308 | B2 | 12/2005 | Guerin et al. | |
| 7,071,261 | B2 | 7/2006 | Davenport et al. | |
| 7,189,767 | B2 | 3/2007 | Gore et al. | |
| 7,223,813 | B2 | 5/2007 | Buckmann et al. | |
| 7,244,782 | B2 | 7/2007 | Guerin et al. | |
| 2004/0034158 | A1 | 2/2004 | Reuter et al. | |
| 2007/0154646 | A1 * | 7/2007 | Bochnik et al. | 427/384 |

* cited by examiner

*Primary Examiner* — Michael M Bernshteyn

(74) *Attorney, Agent, or Firm* — The H.T. Than Law Group

(57) ABSTRACT

The present invention relates to paint extenders or open-time extenders, which are mixed with an architectural coating, such as aqueous latex paints, to increase the coating's open time. The open-time extender comprises acrylic or vinyl latex particles having a mean diameter of less than about 150 nm, and at least one crosslinkable monomer that can crosslink the latex particles in the open-time extender to the latex particles in the architectural coating at ambient conditions. The open-time extender also comprises water and the total solid content of the open-time extender is less than about 15% by weight.

15 Claims, 1 Drawing Sheet

LATEX BASED OPEN-TIME EXTENDERS FOR LOW VOC PAINTS

FIELD OF THE INVENTION

The present invention is directed to paint extenders for low volatile organic compounds (less than 50 g/L) aqueous paint compositions, comprising a nanolatex with hydrophilic functionalities. The paint extenders improve open time without affecting dry film properties.

BACKGROUND OF THE INVENTION

The "open time" of emulsion paint is the time interval during which freshly applied paint can be blended with subsequently applied paint without the appearance of lack of uniformity. Under one approach, open time can be extended by adding volatile organic compounds (VOC) such as glycols into the emulsion paint formulation. However, environmental regulations limit the level of VOCs in paint compositions. In response to such regulations, low VOC aqueous paints have been developed as an alternative to environmentally unfriendly VOC solvent-based paints.

Currently, in many low VOC aqueous paints, open time becomes unacceptably short, especially under fast dry conditions such as low humidity and high temperature. Open time problems include, but are not limited to, skinning of left-open paints, not being able to cut back or blend in during brushing and rolling, and non-uniformity of sprayed surfaces.

Some attempts involve modifying the aqueous paint composition during the manufacturing process. For example, U.S. Pat. No. 5,270,380 is related to a method for forming an aqueous coating by combining a latex polymer and modifying compound having complementary reactable groups. Similarly, U.S. Pat. No. 6,303,189 describes methods where the improvement in open time results from the addition of an aqueous polyurethane dispersion to an aqueous coating composition having at least one-film forming latex polymer.

U.S. Pat. No. 7,071,261 relates to aqueous paint compositions comprising a dispersion of polymeric nanoparticles with a mean diameter of 1 to 50 nanometers, which improves open time. However, the polymeric nanoparticles also include amine functionality and at least one multi-ethylenically-unsaturated monomer.

Another method of improving open time involves the use of a paint extender, which a consumer can add to a pre-manufactured aqueous paint. One latex-based paint extender on the market is Floetrol®, which is commercially available from the Flood Company of Hudson, Ohio. However, when Floetrol® is added to paints, the aqueous paints still tend to form skins, which are indicative of poor open time. Floetrol® also negatively affects water sensitivity and paint flow leveling. Furthermore, Floetrolt® also does not provide compatibility with many commercial low-VOC latex paints since it causes quick syneresis and separation. Floetrol® also reduces the gloss of higher sheen paints, such as semigloss and high gloss paints.

Thus, there remains a need for a latex-based paint extender for low-VOC aqueous paints that overcome the aforementioned limitations of the prior art.

SUMMARY OF THE INVENTION

The present invention relates to an open-time extender adapted to be admixed to an architectural coating composition, such as latex paints, to extend the open time of said architectural coating composition. The open-time extender comprises water, latex particles having a mean diameter of less than about 150 nm, and at least one crosslinkable monomer or oxidatively crosslinkable monomer that can crosslink to itself, to the latex particles in the architectural coating composition or any combination thereof at ambient conditions. Said crosslinkable monomer is preferably a part of the latex particles in the open-time extender. The total solid content of the open-time extender is less than about 15% by weight. The latex particles in the open-time extender are preferably sequentially designed polymers.

BRIEF DESCRIPTION OF THE DRAWINGS

In the accompanying drawings, which form part of the specification and are to be read in conjunction therewith.

DETAILED DESCRIPTION OF THE INVENTION

Figure 1:
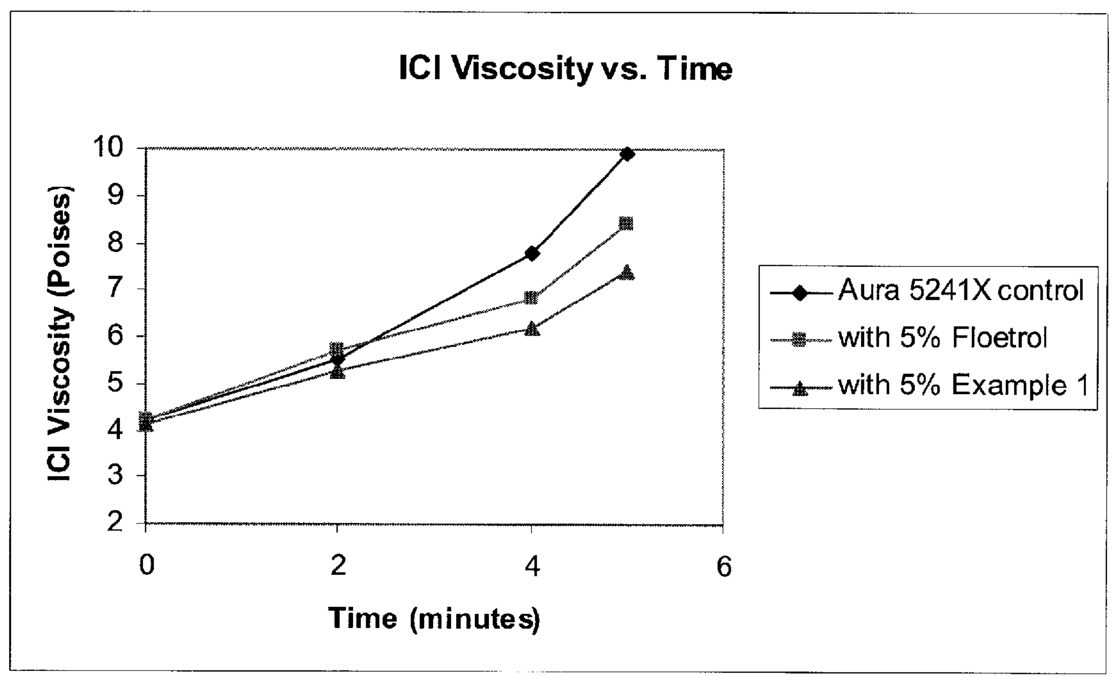
FIG. 1 is a graph plotting ICI viscosity (or high-shear viscosity) as a function of time for a control paint sample, a paint sample containing a conventional paint extender, and a paint extender containing a paint extender according to the present invention.

The present invention concerns paint extenders or open-time extenders, which are admixed with aqueous paints in order to slow down the drying process of the aqueous paints, thereby prolonging their open time. The principle component of such paint or open-time extenders is a latex emulsion comprised of nanosized polymeric particles having a mean diameter of less than about 150 nm, preferably about 50 to about 150 nm, and more preferably less than about 125 nm or less than about 100 nm. The polymeric particles are preferably sequentially designed from one or more hydrophilic monomers and one or more crosslinkable monomers. Non-sequential designed polymers are also suitable. Advantageously, the hydrophilic monomers are believed to form hydrogen bonds with water in the aqueous paints, thereby prolonging open time without using environmentally unfriendly volatile organic compounds (VOCs). Further, in another advantage of the invention, the crosslinkable monomers are believed to crosslink with other latexes in aqueous paints, thereby maintaining dry film properties of the aqueous paints. In alternate embodiments, the nanosized polymeric latex particles are substantially comprised of acrylic or vinyl monomers. The inventive paint or open-time extender comprises mostly water. In one embodiment, the total solid content of latex particles in the paint or open-time extender is less than 15% by weight, more preferably less than about 10% or less than about 8% and most preferably less than about 5%.

As used herein the terms "paint extender" and "open-time extender" means any material added to an architectural composition, such as a latex composition or a paint, preferably an aqueous paint, to slow its drying time, vary its transparency, allow for more even strokes, or to modify any other desired property. A paint extender is added just prior to application of the paint to a substrate or a surface. Conventionally, the quick drying nature of aqueous paints has been addressed by adding water-soluble solvents, e.g. polyethylene glycol or polypropylene glycol, to such aqueous paints in order to improve open time. However, the addition of such volatile organic compounds (VOC) negates the advantageous features of aqueous paints such as low tack, low odor, and low pollution. The present invention is an advance over the existing art because the paint extenders developed herein can be added to aqueous paints in order to improve open time and maintain dry film properties without using any VOC.

VOC is defined according to U.S. Environmental Protection Agency (EPA) Method 24. "Low-VOC" compositions and components can have a VOC content of not more than about 250 g/L (about 25% w/v), preferably not more than about 150 g/L (about 15% w/v), more preferably not more than about 100 g/L (about 10% w/v), most preferably not more than about 50 g/L (about 5% w/v), for example not more than about 30 g/L (about 3% w/v) or not more than about 20 g/L (about 2% w/v).

"Zero-VOC" compositions can also be part of the low-VOC compositions of this invention. Zero-VOC compositions can advantageously have a VOC content of not more than about 10 g/L (about 1% w/v), preferably not more than about 8 g/L (about 0.8% w/v), more preferably not more than about 5 g/L (about 0.5% w/v), for example not more than about 2 g/L (about 0.2% w/v).

The paint or open-time extenders used herein comprise several components including, but not limited to, an innovative nanolatex comprised of hydrophilic constituent monomers, an optional open time agent, a pH adjustor, a crosslinking agent, a preservative, a defoamer, and any suitable combination thereof. The paint or open-time extender is suitable for addition to low VOC or zero VOC paints having a variety of finishes such as high gloss, semi-gloss, satin, eggshell and flat.

The preferred latex described herein contains polymer particles that are sequentially polymerized in at least three stages so as to form at least three distinct phases: the first phase is a seed of relatively small size, the second phase is a core and the third phase is a shell, whereby the seed is the result of the first stage of the sequential emulsion polymerization, the core is the result of the second stage of the sequential emulsion polymerization, and the shell is the result of the third stage of the sequential emulsion polymerization. It is noted that as used herein the "shell" portion of the sequentially polymerized particles includes single shell and multiple shells. Further discussion of such multi-stage latexes can be found in U.S. patent application Ser. No. 11/513,859, which is incorporated herein by reference in its entirety.

The relative positions of the first and second phases of the polymer particles can be internal and external, as well as neighboring, dependent on how the first and second phases of the polymerization are performed. Similarly, the relative positions of the second and third phases of the polymer particles can be internal and external, or neighboring, dependent on how the second and the third phases of the sequential polymerization are carried out. Preferably, the relative positions of the first and the second phases of the polymer particles are internal and external. Also preferably, the relative positions of the second and the third phases of the polymer particles are internal and external.

In an innovative aspect of the present invention, any phase of the nanolatex (e.g., seed, core, or shell) contains monomers responsible for hydrophilicity including, but not limited to, acrylic acid (AA), methacrylic acid (MAA), itaconic acid (IA), hydroxyethyl acrylate (HEA), hydroxyethyl methacrylate, (HEMA), acetoacetoxyethyl methacrylate (AAEM), diacetone acrylamide (DAAM), vinyl acetate (VA) and the like, and copolymers and combinations thereof. By using a nanolatex that contains sufficient hydrophilic functionalities, the inventive open-time extenders and, therefore, the paint that includes the inventive open-time extender, thus has an improved capability to hold water. Generally, the nanolatex contains up to 20% wt of constituent monomers with hydrophilic functionalities. In one particular embodiment, the nanolatex composition contains about 3-7% acrylic or methacrylic acid, about 2-5% hydroxyethyl methacrylate, and about 3-6% diacetone acrylamide. Without being bound by any particular theory, it is believed that such hydrophilic monomers slow down the evaporation of water by forming hydrogen bonds with water, thus prolonging the duration of an aqueous paint's open time.

In addition to hydrophilic monomers that improve open time, the paint extender's nanolatex also advantageously comprises at least one crosslinkable monomer or oxidatively crosslinkable monomer that crosslinks at ambient conditions, thus helping to maintain an aqueous paint's dry film properties. DAAM, which was mentioned above as a hydrophilic monomer, is an example of one such crosslinkable monomer. Other examples include, but are not limited to, monoalkoxydialkyl vinyl silanes, dialkoxyalkyl vinyl silanes, trialkoxy vinyl silanes, monoalkoxy acrylic silanes, dialkoxy acrylic silanes, trialkoxy acrylic silanes, trialkoxy methacrylic silanes, monoalkoxy epoxy silanes, dialkoxy epoxy silanes or trialkoxy epoxy silanes, and the like, and copolymers and combinations thereof In one embodiment, the nanolatex composition can have a crosslinkable monomer content in the range of about 0.01 to 20 wt %, preferably from about 0.02 to 15 wt %, more preferably from about 0.05 to 10 wt %, most preferably from about 0.1 to 8 wt %.

The crosslinkable monomer(s) or oxidatively crosslinkable monomer(s) can crosslink the nanolatex particles in the open-time extender to each other or itself, to the latex particles in the architectural coating composition or both at ambient conditions. In one example, the crosslinkable monomer or oxidatively crosslinkable monomer can crosslink the latex particles in the open-time extender to the architectural coating composition's latex particles at ambient conditions.

In one preferred embodiment, the polymeric nanolatex composition according to the invention can be substantially acrylic. As used herein, the term "acrylic" refers to (co)polymer compositions made from monomers selected from the group consisting of alkyl acrylates, alkyl alkacrylates, acrylic acid, ionic acrylate salts, alkaerylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), styrene, styrene-acrylic and the like, and combinations thereof. As used herein, the term "substantially," at least with regard to a component in a composition, means that the composition contains at least about 90% by weight of that component, preferably at least about 95% by weight of that component, more preferably at least about 97% by weight of that component, most preferably at least about 99% by weight of that component, in some cases at least about 99.9% by weight of that component, or completely comprises (about 100% by weight of) that component.

In another preferred embodiment, the polymeric nanolatex composition according to the invention can be substantially vinyl. As used herein, the term "vinyl" refers to (co)polymer compositions made from monomers selected from the group consisting of vinyl acetate and vinyl chloride, among other vinyl monomers.

To be useful for low VOC or zero VOC paint or open-time extenders, while maintaining outstanding paint properties, the nanolatex of the invention uses monomers that form polymers with different transition glass temperatures ($T_g$) for the seed, the core and the shell. Specifically, the multi-stage sequential emulsion polymerization is conducted so that the seed and the core layers contain monomers that form polymers with relatively higher glass transition temperature ($T_g$) values, while the shell layer contains monomers that form polymers with relatively lower $T_g$ values in order to avoid poor paint properties such as poor block resistance and dirt pick up.

The first phase of the multi-stage sequential emulsion polymerization is the preparation of the relatively hard seed in situ, using monomers that form polymers with relatively higher $T_g$ values (e.g., $T_g \approx 10-130°$ C., preferably about 30-about 110° C.). The second phase of the multi-stage sequential emulsion polymerization is the formation of the relatively hard core by feeding a monomer mixture that forms polymers with relatively higher $T_g$ values (e.g., $T_g \approx 10-90°$ C., preferably about 30-about 70° C.). The third phase of the multi-stage sequential emulsion polymerization is the formation of the relatively soft shell by feeding a monomer mixture that forms polymers with relatively lower $T_g$ values (e.g., $T_g \approx -30-30°$ C., preferably about −10-about 10° C.).

The $T_g$ values can be calculated by applying Fox's law to known $T_g$ values, e.g., from any edition of the Polymer Handbook such as the 3rd ed. (1989), of the homopolymers corresponding to each of the monomers used and their respective weight ratios. For descriptions of this method, see, e.g., U.S. Pat. No. 6,723,779 and/or International Publication No. WO 94/04581, the disclosures of both of which are incorporated herein by reference in their entireties. Alternatively, $T_g$ values can be measured using the differential scanning calorimetry technique, or other known techniques.

In addition to a nanolatex composition, paint/open-time extenders according to the present invention further comprise optional components including commercially available open time agents. When added to a paint/open-time extender containing a crosslinkable nanolatex with hydrophilic functionalities, an open time agent synergistically helps an aqueous paint maintain its viscosity, fluidity, flowability, re-wettability and/or brushability for extended periods of time, e.g., to allow a consumer/user sufficient time to coat a surface relatively smoothly and relatively evenly.

Commercially available open time agents are typically compounds having a relatively low molecular weight (e.g., a number average molecular weight from about 1,000 Daltons to about 100,000 Daltons) and containing a relatively high content of hydrophilic functional groups (e.g., hydroxyls, carboxylic acids, and the like, and combinations thereof). The relatively high concentration of hydrophilic functional groups can, in some cases, advantageously give open time agents a relatively large hydroxyl number (e.g., at least about 100) and/or acid number. The relatively high concentration of hydrophilic functional groups advantageously causes a paint extender, for example, containing the open time agent to synergistically improve the open time of an aqueous paint.

Examples of commercially available low-VOC open time agents include, but are not limited to, Floetrol® as discussed above, those compounds sold by the Aqualon Division of Hercules, Inc. of Wilmington, Del. under the tradename OPTIMA D-4023 and those compounds sold by Morgan Associates of Hometown, Pa. under the tradename WONDERWET™, and the like, and combinations thereof. Preferred open time agents include those that, regardless of molecular weight, contain at least two functional groups capable of reacting with the crosslinking agents present in the paint or open-time extender compositions according to the invention.

The amount of low-VOC open time agents may be in the range of about 0.01 to 10 wt %, preferably from about 0.02 to 8 wt %, more preferably from about 0.05 to 7 wt %, most preferably from about 0.1 to 5 wt % of the paint extender composition.

Examples of pH adjustors useful in the paint extender compositions according to the invention can include, but are not limited to, ammonium hydroxide, sodium hydroxide, sodium carbonate, sodium bicarbonate, potassium hydroxide, potassium carbonate, potassium bicarbonate, ammonium salts, ammonia, amines, aminoalcohols (e.g., 2-amino-2-methyl-1-propanol and/or those compounds sold under the tradename AMP™ 95 by Angus Chemical Company of Buffalo Grove, Ill.), and the like, and combinations thereof. Preferred pH adjustors include ammonia, amines and aminoalcohols. In certain cases, compounds that qualify as pH adjustors can be added for purposes other than adjusting pH (e.g., temporary deactivation of otherwise reactive functional groups, emulsion stabilization, or the like), and yet are still characterized herein as pH adjustors.

Low-VOC crosslinking agents (and crosslinking agents, in general) can typically include at least one crosslinkable functional group (and usually at least two crosslinkable functional groups) capable of reacting with a corresponding reactive (crosslinkable functional) group on another molecule. Non-limiting examples of crosslinkable functional groups include epoxies, silanes, silane ethers, amines, hydroxyls, carboxylic acids, carboxylates, amides, urethanes, thiourethanes, ureas, thioureas, isocyanates, isothiocyanates, acid halides, aldehydes, anhydrides, and the like, and combinations thereof. In a preferred embodiment, the low-VOC crosslinking agent contains both a silane ether functional group and an epoxy functional group (i.e., an epoxysilane). In another preferred embodiment, the crosslinking agent does not include, and in some preferred embodiments specifically excludes, any compound and/or functional group that participates in, facilitates, or catalyzes oxidative crosslinking (e.g., atmospheric oxygen can cause oxidative crosslinking of pendant ethylenic unsaturations and other residual hydrocarbon double bonds). In another embodiment, the crosslinking agent does not include, and in some embodiments specifically excludes, organometallic catalysts (e.g., titanium carboxy-esters that can ester exchange with crosslinkable groups such as silanes to activate a crosslinking reaction). As discussed above, the low-VOC crosslinking agents in the paint or open-time extenders of the invention may be in the range of about 0.01 to 20 wt %, preferably from about 0.02 to 15 wt %, more preferably from about 0.05 to 10 wt %, most preferably from about 0.1 to 8 wt %.

Examples of preservatives or biocides useful in the paint extender compositions according to the invention can include, but are not limited to, hydroxy-functional aza-dioxabicyclo compounds such as those commercially available from ISP under the trade name Nuosept™ 95, those compounds sold under the trade name SKANE™, isothiazolones such as those sold under the trade name Kathon™ from Rohm and Hass Company of Philadelphia, Pa., Polyphase™ additives from Troy Corp. and the like, and combinations thereof.

Examples of defoamers useful in the paint extender compositions according to the invention can include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

The types of finishes of the paints using the latex-based paint extenders of the invention can be high gloss, semi-gloss, satin or "silk", eggshell, or flat. The degree of shininess, or gloss, is determined by the amount of pigment present in the paint. Without any pigment, most binders will yield a high gloss finish. Gloss is measured in reflectivity of the painted surface at angles of 20°, 60°, and 85° from the vertical position.

The typical reflectivity of paints with different gloss at different angles are shown below

| Type of Paint | 20° Gloss | 60° Gloss | 80° Gloss |
|---|---|---|---|
| High Gloss | 20-90 | 70-95 | — |
| Semi-Gloss | 5-45 | 25-75 | — |
| Satin | — | 5-25 | 10-40 |
| Eggshell | — | 2-15 | 5-25 |
| Flat | — | 0-10 | 0-15 |

EXAMPLES

The following Examples are merely illustrative of certain embodiments of the invention. The following Examples are not meant to limit the scope and breadth of the present invention, as recited in the appended claims.

Example 1

Paint/Open-Time Extender Formulated Using Multi-Stage Acrylic Latex

A paint extender (100 gallons) was prepared using a multi-stage acrylic latex having a 47.1% solid content and mean particle size of 95 nm. This paint extender did not comprise an open time agent. The paint extender contained the following quantity of ingredients listed in Table 1.

TABLE 1

Ingredients of Acrylic Latex-Based Paint Extender

| Ingredient | Quantity (pounds) |
|---|---|
| Acrylic Latex (47.1% wt solid content) | 68.9 |
| Water | 763.8 |
| AMP-95 ® (multifunctional additive, commercially available from by Angus Chemical Company of Buffalo Grove, Ill.) | 0.1 |
| KATHON ® LX 1.5% (preservative, commercially available from Rohm and Haas Company of Philadelphia, Penn.) | 0.8 |
| Adipic Dihydrazide (crosslinker) | 0.8 |
| BYK-024 ® (defoamer, commercially available from BYK-Chemie GmbH of Wesel, Germany) | 1.0 |
| Total Weight | 835.4 |

The acrylic latex makes up about 8.25% by weight of inventive Example 1, and since the acrylic latex has a 47.1% solid content, the total solid content of inventive Example 1 is about 4% by weight.

About 83.5 lbs of the above paint extender of Example 1 was added to Benjamin Moore & Co.'s AURA® eggshell 524-1X paint, which is a low VOC latex-based paint wherein the latex is not crosslinkable and has a mean particle size of about 160 mn. Example 1 makes up about 10% of this blend or mixture. This inventive sample was compared with a control AURA® eggshell 524-1X paint sample without any paint extenders as well as AURA® eggshell 524-1X paint samples containing 10% Floetrol®, Wonderwetg® IV and Aqualon Optima® D4023, which are commercially available open-time agents and 10% water. More specifically, the anti-skinning open time property of these six samples was evaluated by opening cans containing the samples at 75° F. and 40% relative humidity, and then measuring the time it took to form skins. Table 2 below presents the results of this experiment.

TABLE 2

Time for Paint Samples to Form Skins at 75° F. and 40% Relative Humidity

| Paint | Time (Minutes) | $t_2/t_1$ |
|---|---|---|
| Control AURA ® Eggshell 524-1X | 10 | 1.0 |
| AURA ® Eggshell 524-1X with 10% of Example 1 Paint Extender | 40 | 4.0 |
| AURA ® Eggshell 524-1X with 10% Water | 30 | 3.0 |
| AURA ® Eggshell 524-1X with 10% Floetrol ® | 15 | 1.5 |
| AURA ® Eggshell 524-1X with 10% Wonderwet ® IV | 34 | 3.4 |
| AURA ® Eggshell 524-1X with 10% Aqualon Optima ® | 35 | 3.5 |

Table 2 shows that when the inventive paint extender of Example 1 is added to a low VOC latex-based paint, the paint's open time is improved over the paint with a conventional paint extender added and over the paint with water added. More particularly, the improvement in open time can be quantified by the expression $T=t_2/t_1$ wherein $t_1$, is the open time of a control paint (i.e., a paint without any additive such as a paint extender or water) and $t_2$ is the open time of a paint with an additive such as a paint extender or water. According to the present invention, the addition of the inventive paint/open-time extender from Example 1 results in value of T that is higher than that of the conventional open time agents and water.

Wonderwet has about 20% solid content and Optima has about 18% solid content. These two additives were diluted to about 4% solid content, similar to that of Example 1, and then 10% by weight of the diluted solutions are used in this Example. Floetrol has about a 1% solid content and this additive is used in its unmodified state in this Example.

FIG. 1 further demonstrates the extended open time property of paints containing the inventive paint extender of Example 1. More specifically, three paint samples were prepared: a control sample of AURA® eggshell 524-1X paint; a sample of AURA® Eggshell 524-1X with 5% Floetrol®; and a sample of AURA® Eggshell 524-1X with 5% of the inventive paint extender from Example 1. Each of the paint samples was drawn down on drawdown cards and the ICI viscosity (high-shear viscosity) was measured as a function of drying time using an ICI viscometer. A relatively quick increase in ICI viscosity correlates with a relatively short open time. Because ICI viscosity took longer to increase for the sample containing the inventive paint/open-time extender of Example 1, the results demonstrate that the inventive paint extender is responsible for improving open time. Results similar to those shown in FIG. 1 were obtained when the experiment was repeated using AURA® flat 522 and AURA® satin 526 paints. The ICI open time measurements for all three paints are shown below in Table 3.

TABLE 3

| ICI Open Time Measurements | | | |
|---|---|---|---|
| Time (min) | | with 5% Floetrol | with 5% Example 1 |
| | Aura 524 Eggshell | | |
| 0 | 4.2 | 4.2 | 4.1 |
| 2 | 5.5 | 5.7 | 5.3 |
| 4 | 7.8 | 6.8 | 6.2 |
| 5 | 9.9 | 8.4 | 7.4 |
| | Aura 522 Flat | | |
| 0 | 4.5 | 4.1 | 3.9 |
| 2 | 5.7 | 5.4 | 5.2 |
| 4 | 8.4 | 7.3 | 6 |
| 5 | 9.7 | 8.7 | 7.1 |
| | Aura 526 Satin | | |
| 0 | 3.4 | 3.2 | 3.1 |
| 2 | 4.5 | 4.2 | 4 |
| 4 | 6.7 | 6.0 | 5.5 |
| 5 | 8.8 | 7.5 | 6.4 |

In all instances, the ICI viscosities of these samples show that with the inventive paint/open-time extender, the increases in ICI viscosities are the slowest resulting in longer open-time for the inventive paint/open-time extender.

In addition to improving open time, the inventive paint extender of Example 1 also helps maintain the dry film properties of paints better than a conventional open time agents, such as Floetrol®, Wonderwet® IV and Aqualon Optima® D4023. Both the inventive paint extender of Example 1 and Floetrol® were added to samples of Benjamin Moore's AURA® paints, and the resulting dry film properties are noted in Table 4 below. In many instances, the dry film properties of aqueous paints comprising paint extenders are characterized relative to a standard aqueous paint containing no paint extender.

TABLE 4

Dry Film Properties of Paints Containing an Inventive Paint Extender vs. Conventional Paint Extender

| Dry Film Property | Paint Containing Inventive Paint Extender of Example 1 | Paint Containing Conventional Open time agent Floetrol ® | Paint Containing Conventional Open time agent Wonderwet IV | Paint Containing Conventional Open time agent Optima D4023 |
|---|---|---|---|---|
| Flow Leveling | Better than Standard Paint: Rating of 5 | Worse than Standard Paint: Rating of 2-3 | Better than Standard Paint: Rating of 5 | Better than Standard Paint: Rating of 5 |
| Sheen | Comparable to Standard Paint: 5 Point Gloss Loss | Lower than Standard Paint: 5-15 Point Gloss Loss | Comparable to Standard Paint: 5 Point Gloss Loss | Comparable to Standard Paint: 5 Point Gloss Loss |
| Water Resistance | Comparable to Standard Paint: Rating of 4 | Worse than Standard Paint: Rating of 2 | Worse than Standard Paint: Rating of 2 | Worse than Standard Paint: Rating of 2 |
| Syneresis/ Settling 4 hrs | None | Syneresis with All AURA ® Paints | None | None |
| Syneresis/ Settling 12 hrs | None | Severe Syneresis with All AURA ® Paints | None | None |
| Wet Adhesion | Comparable to Standard Paints | Comparable to Standard Paints | Comparable to Standard Paints | Comparable to Standard Paints |
| Water Staining | Comparable to Standard Paints | Comparable to Standard Paints | Comparable to Standard Paints | Comparable to Standard Paints |
| Color Transfer | Comparable to Standard Paints | Comparable to Standard Paints | Comparable to Standard Paints | Comparable to Standard Paints |
| Color Rub-up | Comparable to Standard Paints | Comparable to Standard Paints | Comparable to Standard Paints | Comparable to Standard Paints |
| Blocking | Comparable to Standard Paints | Comparable to Standard Paints | Comparable to Standard Paints | Comparable to Standard Paints |
| Hiding Power (1X) 10% | 1.0 to 1.2% loss in contrast ratio | 1.0 to 1.2% loss in contrast ratio | 1.0 to 1.2% loss in contrast ratio | 1.0 to 1.2% loss in contrast ratio |

Flow leveling tests were performed using samples of AURA® 526-1X semigloss paint containing paint extenders. For each sample, containing either an inventive or conventional paint extender, a drawdown was made with a flow leveling bar and dried overnight. Thereafter, a rating of 1 to 10 was assigned, with 10 being perfectly flat on a drawdown card.

Sheen was measured by quantifying gloss loss at 60° from the vertical position for samples of AURA® 526-1X semi-gloss paint.

Water resistance tests were performed using samples of AURA® 526-1X semigloss paint containing paint extenders. Using a 3 mil-bar, samples were drawn down and allowed to dry for one week. To test for water resistance, a drop of water was added to each sample, the water was wiped off after a minute, and then the paint film was scratched with a finger nail. The samples were rated on a scale of 1-5 depending on how easily the film could be taken off.

For the syneresis test, the paint extender is added to the paint, mixed and allowed to stand. Liquid separation is checked after 4 and 12 hours. Syneresis is the contraction of the paint composition by exudation of liquid.

The wet adhesion test determines the intermediate adhesion of a water base coating prior to full cure. A 3 mil drawdown is prepared on a substrate and dried. Afterward the sample is placed in a 100% relative humidity for one hour. The sample is then inspected for blisters or other blemishes. Fingernail scratch or thumb rub test can be used to check for adhesion. A cross hatch test according to ASTM D3359 method B can also be used after the sample dried.

The water staining test determines the susceptibility of a latex coating to staining due to the drying of water droplets on the surface. A 3 mil drawdown is prepared and dried. Three to five drops of water are deposited thereon and dried, and a visual inspection is performed to see whether stain is present.

The color rub-up test generally tests a color change in a wet film, caused by rubbing with the finger, which may not disappear. A thin paint film is deposited on a substrate, such as Lenetta black and white cards, and air dried for a duration that is dependent on the sheen of the paint. An index finger is placed on the film and is twisted a predetermined number of clockwise and counterclockwise directions. The film is then examined for color streaking.

The blocking test is a test of a paint's tendency to stick to itself after drying. In this test, a paint film is allowed to dry at room temperature for one week. Two samples of the dried paint film are pressed together at room temperature and at elevated temperature. The samples are then pulled apart and inspected to determine whether the films or portions thereof stick together.

The hiding power test determines how well a paint film hides the color and/or pattern of the covered substrate. A contrast ratio is a measurement of the hiding power (or opacity) of a paint. The drawdown was dried overnight and the contrast ratio (C/R) of the dried film was measured with a spectrophotometer. C/R can be measured in accordance with ASTM D2085-88 "Standard Test Method for Hiding Power of Paints by Reflectometry."

The experimental results demonstrate that the addition of the inventive paint/open-time extender to a commercially available aqueous paint results in better dry film properties than conventional open time agent Floetrol®. Flow leveling is superior in an aqueous paint comprising the inventive paint/open-time extender than a standard paint without any paint extender. Although an aqueous paint comprising the inventive paint/open-time extender has sheen and water resistance properties comparable to a standard paint, these properties are better than those exhibited by an aqueous paint comprising Floetrol®. Furthermore, aqueous paints comprising Floetrol® exhibit syneresis within four hours and severe syneresis within twelve hours, indicating that the chemistry of Floetrol® is not compatible with most acrylic systems. By contrast, aqueous paints comprising inventive paint/open-time extenders did not result in syneresis.

Although, conventional open time agent Wonderwet® and Aqualon Optima® perform as well as the inventive paint/open-time extender, these conventional open time agent did not perform as well in the water resistance test. Aqueous paints comprising Floetrol®, Wonderwet IV® and Aqualon Optima® and the inventive paint/open-time extender exhibit similar wet adhesion, water staining, color transfer, color rub up, blocking, and hiding power properties.

Additionally, since the inventive paint/open-time extender cross-link with the latex in the paint when dried at ambient conditions unlike the conventional open time agents, the inventive open-time extender adds to the structural integrity of the dried film. Without being bound to any particular theory, the inventors of the present invention believe that this causes improved water resistance of the dried film.

Examples 2A and 2B

Paint Extender Formulated Using Multi-Stage Vinyl Latex

In Example 2A, a paint extender (100 gallons) was prepared using a multi-stage vinyl latex having a 49.6% solid content and mean particle size of 95 nm. In Example 2B, the paint extender further comprised a commercial open time agent (Aqualon Optima D-4023), which acts synergistically with the inventive Example 2A to prolong the time it takes for a paint to dry. More particularly, the paint extenders contained the following quantity of ingredients are listed below in Table 5.

TABLE 5

Ingredients of Vinyl Latex-Based Paint Extender

| Ingredients | Example 2A Quantity (pounds) | Example 2B Quantity (pounds) |
|---|---|---|
| Vinyl Latex (49.6% wt solid content) | 153.6 | 153.6 |
| Water | 660.8 | 660.8 |
| Aqualon Optima D-4023 (open time agent, commercially available from the Aqualon Division of Hercules, Inc. of Wilmington, Del.) | 0.0 | 17.0 |
| AMP-95 ® (multifunctional additive, commercially available from by Angus Chemical Company of Buffalo Grove, Ill.) | 0.2 | 0.2 |

TABLE 5-continued

| Ingredients of Vinyl Latex-Based Paint Extender | | |
|---|---|---|
| Ingredients | Example 2A Quantity (pounds) | Example 2B Quantity (pounds) |
| KATHON ® LX 1.5% (preservative, commercially available from Rohm and Haas Company of Philadelphia, Penn.) | 0.8 | 0.8 |
| BYK-024 ® (defoamer, commercially available from BYK-Chemie GmbH of Wesel, Germany) | 2.0 | 2.0 |
| Total Weight | 800.4 | 817.4 |

The total solid content of Example 2A is about 9.3% and the total solid content of Example 2B is about 9.5%. The inventive Examples 2A and 2B were added to Benjamin Moore & Co.'s AURA® flat 1X paint, which is a low VOC latex-based paint wherein the latex is not crosslinkable and has a mean particle size of about 160 in, in an amount equal to about 10% of the blend or mixuture. This inventive samples were compared with a control AURA® flat paint sample without any paint extenders as well as AURA® flat 1X paint samples containing 10% of the conventional Floetrol®, which is a conventional open time agent discussed above, and 10% water. More specifically, the anti-skinning open time property of these four samples was evaluated by opening cans containing the samples at 75° F. and 40% relative humidity, and then measuring the time it took to form skins. Table 6 below presents the results of this experiment.

TABLE 6

| Time for Paint Samples to Form Skins at 75° F. and 40% Relative Humidity | |
|---|---|
| Paint | Time (Minutes) |
| Control AURA ® Flat 1X | 10 |
| AURA ® Flat 1X with 10% of the Inventive Paint Extender in Example 2A | 45 |
| AURA ® Flat 1X with 10% of the Inventive Paint Extender in Example 2B (with Aqualon Optima D-4023 | >50 |
| AURA ® Flat 1X with 10% Floetrol ® | 15 |
| AURA ® Flat 1X with 10% Water | 30 |

Table 6 shows that when the inventive paint/open-time extenders of Example 2 are added to a low VOC latex-based paint, the paint's open time is improved over a conventional paint extender such as Floetrol®. More particularly, it should be noted that the admixture of the inventive paint/open time extender with a conventional open time agent (such as Aqualon Optima) works synergistically to improve the open time of the paint.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

We claim:

1. An open-time extender adapted to be admixed to an architectural coating composition to extend the open time of said architectural coating composition, said open-time extender comprising latex particles having a mean diameter of less than about 150 nm, at least one crosslinkable monomer or oxidatively crosslinkable monomer that can crosslink at ambient conditions, and water, wherein the total solid content of the open-time extender is less than about 15% by weight.

2. The open-time extender of claim 1, wherein the total solid content of the open-time extender is less than about 10%.

3. The open-time extender of claim 2, wherein the total solid content of the open-time extender is less than about 8%.

4. The open-time extender of claim 3, wherein the total solid content of the open-time extender is less than about 5%.

5. The open-time extender of claim 1, wherein the acrylic latex particles of the open-time extender comprise at least one of acrylic acid (AA), methacrylic acid (MAA), itaconic acid (IA), hydroxyethyl acrylate (HEA), hydroxyethyl methacrylate, (HEMA), acetoacetoxyethyl methacrylate (AAEM), diacetone acrylamide (DAAM), and copolymers thereof.

6. The open-time extender of claim 1, wherein the acrylic latex particles in the open-time extender are selected from a group consisting of alkyl acrylates, alkyl alkacrylates, acrylic acid, ionic acrylate salts, alkacrylic acids, ionic alkacrylate salts, acrylamide, alkacrylamides, monoalkyl acrylamides, monoalkyl alkacrylamides, acrylonitrile, alkacrylonitriles, substituted versions thereof (e.g., hydroxyalkyl acrylates, hydroxyalkyl alkacrylates, alkacrylamidoalkyl ethyleneureas, alkenyloxyamidoalkyl ethyleneureas, and the like), styrene, styrene-acrylic and copolymers and combinations thereof.

7. The open-time extender of claim 1, wherein at least one crosslinkable monomer or oxidatively crosslinkable monomer in the open-time extender is selected from a group consisting of diacetone acrylamide, monoalkoxydialkyl vinyl silanes, dialkoxyalkyl vinyl silanes, trialkoxy vinyl silanes, monoalkoxy acrylic silanes, dialkoxy acrylic silanes, trialkoxy acrylic silanes, trialkoxy methacrylic silanes, monoalkoxy epoxy silanes, dialkoxy epoxy silanes or trialkoxy epoxy silanes and copolymers and combinations thereof.

8. The open-time extender of claim 1 further comprising at least one of an open time agent, pH adjustor, a second crosslinking agent having at least one crosslinkable functional group, a preservative, a biocide and a defoamer.

9. The open-time extender of claim 1, wherein the crosslinkable monomer comprises at least a silane ether functional group and an epoxy functional group.

10. The open-time extender of claim 1, wherein the acrylic latex particles in the open-time extender have a mean diameter of greater than about 50 nm.

11. The open-time extender of claim 1, wherein the acrylic latex particles in the open-time extender have a mean diameter of less than about 125 nm.

12. The open time extender of claim 1, wherein the acrylic latex particles of the open-time extender comprises sequentially designed latex polymers.

13. The open-time extender of claim 12, wherein the sequentially designed latex polymers have a seed, a core and at least one shell.

14. The open-time extender of claim 1, wherein the architectural coating composition is a paint composition.

15. The open-time extender of claim 1, wherein the at least one crosslinkable monomer or oxidatively crosslinkable monomer that can crosslink to the latex particles in the architectural coating at ambient conditions.

* * * * *